Jan. 31, 1967    J. G. CLARY ETAL    3,301,479
CASH REGISTER DRAWER CONSTRUCTION
Filed Nov. 8, 1965
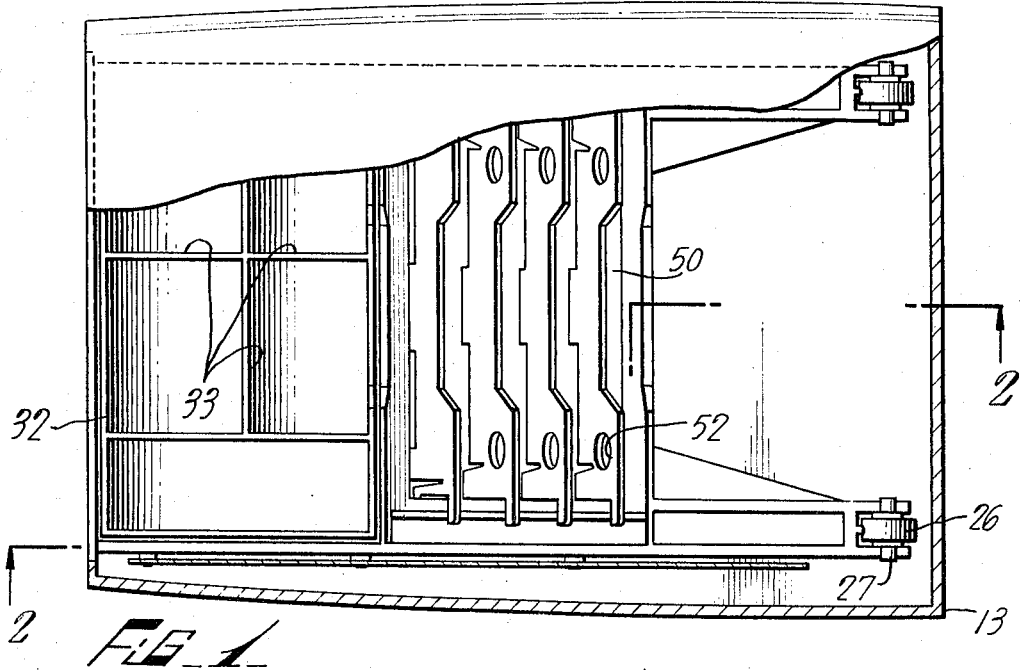
FIG 1
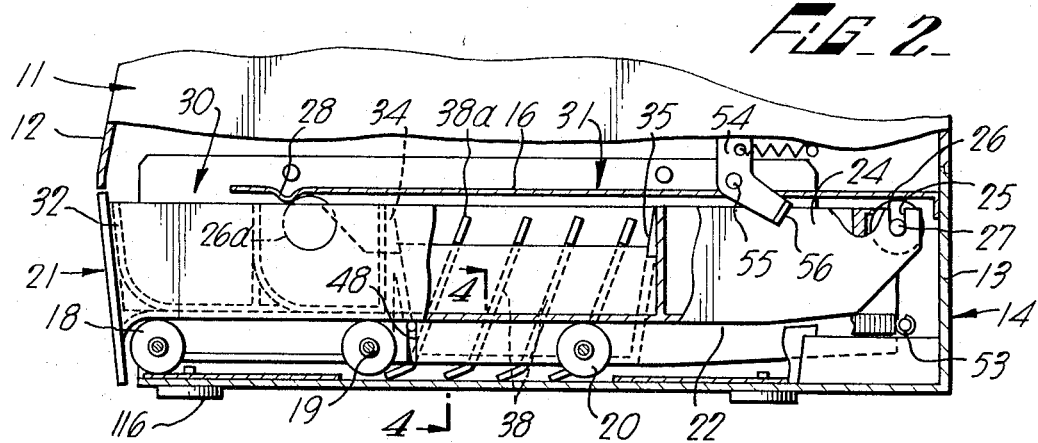
FIG 2
 
FIG 3    FIG 4
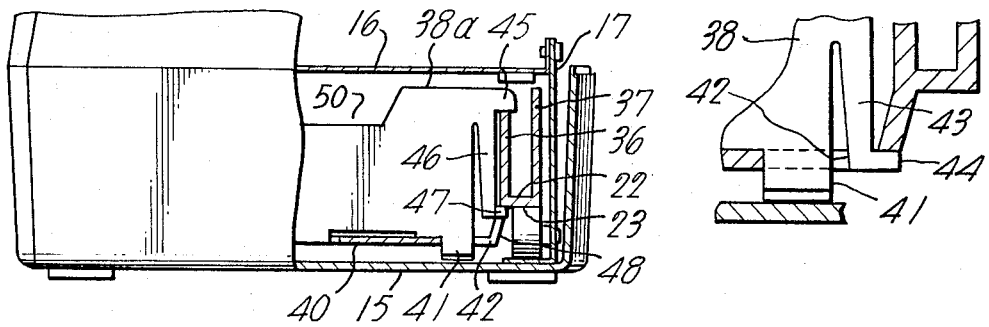

United States Patent Office 3,301,479
Patented Jan. 31, 1967

3,301,479
CASH REGISTER DRAWER CONSTRUCTION
John G. Clary, Pasadena, and Richard E. Busch, La Puente, Calif., assignors to Addmaster Corporation, San Gabriel, Calif., a corporation of California
Filed Nov. 8, 1965, Ser. No. 506,671
6 Claims. (Cl. 235—22)

This invention relates to cash registers and has particular reference to cash drawers for such registers.

The counter space within a store or the like which is allocated to or available for a cash register is often at a premium and is usually very limited. However, on the other hand, a certain amount of space is required in a cash drawer in order to contain bills and coins of different denominations. For example, heretofore, cash drawers intended to contain American currency have usually been built with at least four bill compartments and several coin compartments or sections. The bill compartments are generally arranged side-by-side and are constructed to permit the bills to be stacked therein in a horizontal plane, resulting in a cash register having a cash drawer compartment on the order of fourteen inches or more in width.

Accordingly, the width of the cash drawer dictates the size of the cash register. Such width is considerably greater than the width of small cash register mechanisms and thus destroys the space saving advantages which might otherwise be offered by such small registers. Also, since the cost of material, such as plastic, increases as the size of the drawer increases, it is highly desirable to maintain a small size drawer. Further, many business establishments remove the cash drawer from their cash register each evening to place the same in a safe or vault and therefore a smaller cash drawer would be easier and more convenient to handle.

Accordingly, it is a principal object of the present invention to provide a cash register having a cash drawer of smaller size than those presented heretofore and yet which has the same general cash capacity.

Another object is to provide a cash drawer which is narrower than cash drawers employed heretofore and yet which will receive substantially the same amount of paper money, etc., as previous cash drawers.

Another object is to facilitate inserting or withdrawing paper money bills from a bill compartment of a cash drawer.

Another object is to provide a cash drawer which is economical to manufacture and assemble.

The manner in which the above and other objects of the invention are accomplished will be readily understood on reference to the following specification when read in conjunction with the accompanying drawings, wherein:

FIG. 1 is a plan view, partly in section, of a cash registering machine embodying a preferred form of the present invention.

FIG. 2 is a side view, partly in section and partly broken away, of the cast registering machine.

FIG. 3 is a front view, partly in section and partly broken away, of the cash registering machine.

FIG. 4 is a fragmentary sectional view taken substantially along the line 4—4 of FIG. 2.

Describing now the preferred embodiment of the invention in detail and referring to the drawing, the cash registering machine comprises an upper register housing partly shown at 11 which contains the usual registering devices, printing equipment, machine controls, etc. The housing includes a skirt 12 which is coextensive with walls 13 forming part of a cash drawer housing 14 located directly below the register housing. A bottom wall 15 integral with the side walls 13 of the drawer housing is supported by feet 116 from a suitable counter top or the like.

A bottom pan member 16 is located at the bottom of the register housing 11 and is attached to spaced vertical side walls, one of which is shown at 17, suitably secured at their lower ends to the floor member 15 of the drawer housing.

Drawer support rollers 18, 19 and 20 are rotatably mounted on each of the wall members 17 for supporting a cash drawer generally indicated at 21 for movement from its inner position shown in FIGS. 1 and 2, to an outer position, in which at least a major portion extends to the left in FIG. 2 and out of the cash drawer housing.

The cash drawer 21 is preferably molded of plastic and has a stepped formation 22 along each side thereof, the under surface 23 of which forms a track for movement over the rollers 18 to 20.

A pair of spaced arms 24 are formed integrally with the drawer and extend rearwardly to terminate in sockets, the walls of which have vertical slots 25 formed therein. Rollers 26 are provided having trunnion bearing studs 27 rotatably mounted in the slots 25. The rollers 26 ride along the under surface of the bottom pan member 16 when the drawer is moved in or out of its housing and abut against depending formations 28 when the drawer reaches its outer position so as to normally prevent withdrawal of the drawer beyond such position. However, when the drawer is in such outer position, in which case the rollers 26 assume their dot-dash line positions 26a, it can be readily removed by tilting the same upward about the rollers 18 to lower the roller 26 below the projection 28 so that it may be withdrawn further.

When the drawer 21 is moved to its inner illustrated position against the action of a tension spring, partly shown at 53, it is latched in such position by a latch 54 pivotally supported at 55 and engageable with a notch 56 formed in one of the side walls of the drawer. Upon operation of the register mechanism, the latch 54 is rocked counterclockwise by means (not shown), permitting the spring 53 to move the drawer to its outer position. The spring 53 is suitably attached at its forward end (not shown) to a part of the drawer housing 14 and at its rear end to a part of the cash drawer.

The drawer 21 is divided into a forward coin compartment 30 and a rear paper money or bill compartment 31. A coin tray 32 having a series of coin receiving sections 33 for storing and segregating coins of various denominations is removably fitted within the coin compartment 30.

According to the present invention, the compartment 31 is formed with oppositely inclined front and rear side walls 34 and 35, respectively. The remaining side walls, i.e. 36, extend vertically and are spaced laterally and inwardly from the main side walls, i.e. 37, of the drawer.

A series of spaced dividers 38 are located within the compartment 31. Such dividers extend between the side walls 36 and are pivotally supported by the floor 40 of the compartment for limited pivotal movement.

As shown in FIGS. 3 and 4, each of the dividers has a depending foot 41 which extends through a slot 42 on the floor and which, when the drawer is in its inner position, rides over the bottom wall 15 of the drawer housing.

The three rearmost dividers 38 are normally prevented from being withdrawn from the compartment by spring legs 43 (FIG. 4) formed integrally therewith and terminating in toes 44 which underly adjacent edges of the respective slots 42. However, the dividers may be readily removed by springing the legs 43 inwardly and then lifting the dividers out.

It will be noted that the various dividers 38 are limited to move from their positions illustrated in FIG. 2 wherein they extend substantially parallel to the rear wall 35 to positions wherein they extend substantially parallel with the forward wall 34. For this purpose, ears 45 extend outwardly from the upper ends of the dividers to overly the upper edges of the adjacent compartment walls 36, thereby limiting swinging movement thereof.

The forward divider 38a is also pivotally supported on the floor 40. However, special spring arms 46 (FIG. 3) are formed thereon which terminate in lateral projections 47 guided within vertical slots 48 formed in the side walls of the compartment, coextensive with the slots 42. Such spring arms bias the divider 38a forwardly toward a pivoted position wherein it lies against the forward side wall 34. However, the divider is prevented from moving when the drawer is in its inner position by its respective guide foot 41.

The various dividers form separate bill receiving sections or compartments in which paper money bills may be laid on edge across the width of the drawer and may be segregated into batches of different denominations. For example, the section formed between the forward divider 38a and the second divider may receive one-dollar bills, the next section may receive five-dollar bills, etc.

In order to facilitate insertion or withdrawal of bills from the different sections, the various dividers, as well as the forward wall 34, are notched at 50. Also, when the drawer is moved to its forward open position, the feet 41 of the various dividers 38 move over the forward edge of the bottom wall 15. At this time, the spring arms 46 of the forward divider 38a become effective to swing such divider forwardly into engagement with the wall 34, forming a V-shaped section, permitting ready insertion or withdrawal of paper bills therein. The remaining dividers are thus also free to be swung forwardly if desired in order to facilitate access to the sections formed thereby.

When the drawer is moved to its inner illustrated closed position, the various feet 41 wipe over the forward edge of the floor 15 and in doing so force the dividers into their rearward positions shown in FIG. 2. This serves to flatten the various batches of bills and also tends to hold them in place. Holes 52 are preferably formed in the dividers 38 in locations to permit viewing of the monetary amounts of the bills.

In the event that a relatively large batch of bills of one denomination are regularly handled, one or more of the dividers may be readily removed to provide a larger section for receiving such bills.

Although the invention has been described in detail and certain specific terms and languages have been used, it is to be understood that the present disclosure is illustrative rather than restrictive and that changes and modifications may be made without departing from the spirit or scope of the invention as set forth in the claims appended hereto.

Having thus described the invention, what is desired to be secured by United States Letters Patent is:

1. A cash registering machine comprising a cash drawer housing, a cash drawer, means on said housing for guiding said drawer from an inner position within said housing to an outer position at least partly out of said housing, said drawer having a compartment for receiving paper money bills on edge, spaced dividers in said compartment for dividing said compartment into a plurality of relatively narrow bill sections for receiving different groups of said bills, means pivotally supporting each of said dividers on said drawer for movement between a first position inclined at an angle to the vertical and a second position, and elements on said dividers engageable with a part on said housing for moving said dividers into said second positions upon movement of said drawer into said inner position and for maintaining said dividers in said second positions when said drawer is in said inner position, said elements disengaging from said part during movement of said drawer to said outer position whereby to permit movement of said dividers to said first positions.

2. A cash registering machine according to claim 1 wherein said pivotal supporting means comprises an edge of each of said dividers, said edges being pivotally supported on the floor of said drawer.

3. A cash registering machine according to claim 2 wherein said floor of said cash drawer has openings therin and said elements extend through said openings and are slideably engageable with said part.

4. A cash register according to claim 1 wherein said dividers have arms cooperable with said drawer to normally prevent withdrawal of said dividers from said drawer, said arms being yieldable out of cooperative relation with said drawer to permit withdrawal of said dividers.

5. A cash registering machine according to claim 1 wherein at least one of said dividers has a spring arm cooperable with said drawer to move said last mentioned divider into said first position during movement of said drawer to said outer position.

6. A cash register according to claim 5 wherein said spring arm normally cooperates with said drawer to prevent withdrawal of said divider.

References Cited by the Examiner

UNITED STATES PATENTS

| | | | |
|---|---|---|---|
| 1,106,265 | 8/1914 | Whittle | 211—11 |
| 2,239,840 | 4/1941 | Casey | 211—11 |
| 2,629,863 | 2/1953 | Stern et al. | |
| 2,689,571 | 9/1954 | Watkins | 129—16.7 |
| 2,890,798 | 6/1959 | Hohman | 211—11 |
| 3,224,824 | 12/1965 | Remke | 312—183 |

RICHARD B. WILKINSON, *Primary Examiner.*

S. J. TOMSKY, *Assistant Examiner.*